United States Patent [19]

Kampjes et al.

[11] 3,731,804
[45] May 8, 1973

[54] CONTROL OF SENSITY OF THICKENER UNDERFLOW SLURRY

[75] Inventors: Gerrit Richard Kampjes; Ronald Ian Wilson, both of Alberta, Edmonton, Canada

[73] Assignee: Sherritt Gordon Mines Limited, Toronto, Ontario, Canada

[22] Filed: Jan. 18, 1971

[21] Appl. No.: 107,116

[52] U.S. Cl. .........................210/83, 210/86, 210/90, 210/113
[51] Int. Cl. .............................................B01d 21/24
[58] Field of Search......................210/83, 86, 90, 96, 210/113, 114

[56] References Cited

UNITED STATES PATENTS

| 3,208,592 | 9/1965 | Smith | 210/96 X |
|---|---|---|---|
| 3,504,795 | 4/1970 | Johnson | 210/114 X |
| 3,279,604 | 10/1966 | Leviel | 210/101 |
| 3,077,991 | 2/1963 | Kelly | 210/101 X |

Primary Examiner—John Adee
Attorney—Frank I. Piper, Arnie I. Fors and James T. Wilbur

[57] ABSTRACT

The low and high pressure sides of a differential pressure meter are communicated by means of water purged conduits to tap points in the side of a thickener. The tap points are at different elevations and by means of the meter, the differential pressure of the slurry within the thickener at the tap points is continuously monitored. The rate of removal of underflow slurry discharged from the thickener is regulated in response to monitored changes in the differential pressure such that a desired solids to liquid ratio is maintained within the thickener.

4 Claims, 1 Drawing Figure

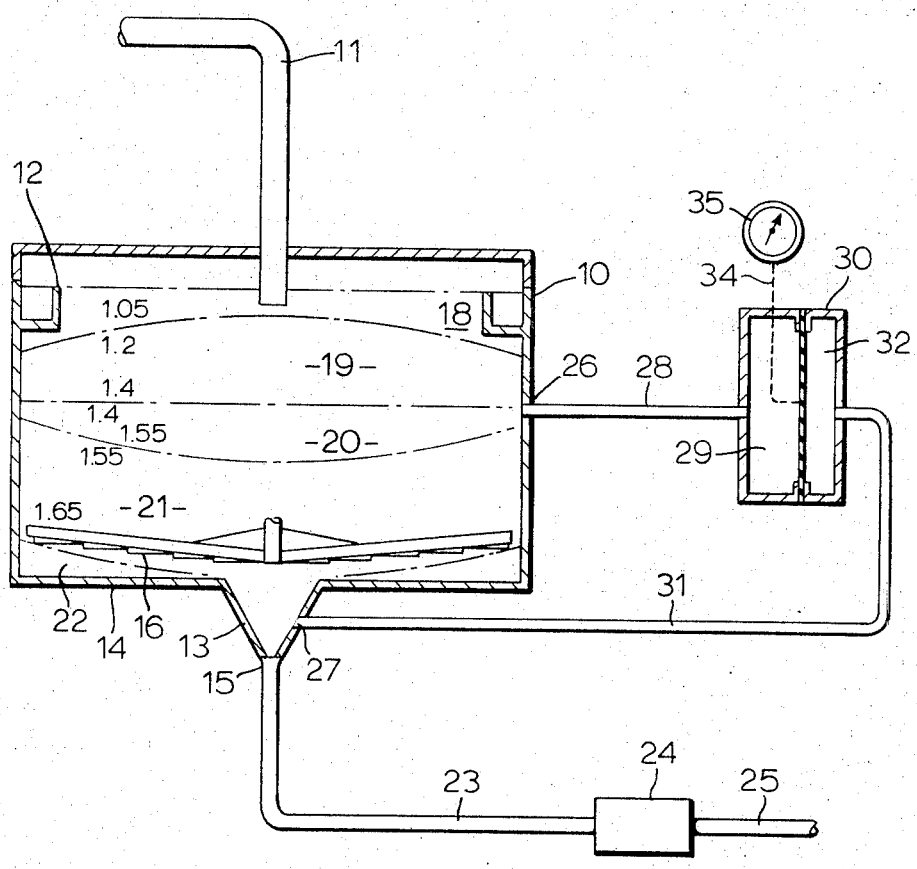

CONTROL OF SENSITY OF THICKENER UNDERFLOW SLURRY

This invention relates to a method and apparatus for controlling the density of a mixture of solids and solution. It is particularly directed to providing a method and apparatus for controlling the density of thickener underflow slurries passing from a thickener to a solids-liquid separation treatment.

The separation of the solids fraction of a mixture of solids and solution, or slurry, usually in the form of finely divided solid particles, from the liquid fraction, such as by filtration or centrifuging, generally is preceded by a thickening treatment wherein the solids fraction is permitted to settle towards the lower part of a thickener from which it is withdrawn as the "thickener underflow," while the lighter, liquid fraction containing a lesser amount of solids, rises to the upper part of the thickener from which it overflows as the "thickener overflow."

A thickener usually is a vertically positioned, cylindrical vessel of a size determined by the amount of slurry to be treated in a predetermined unit of time. The central portion of the bottom of the thickener usually is conical and slopes downwardly towards the underflow discharge port. Slurry which comprises finely divided solid particles and solution is fed into the upper part of the thickener. Solid particles settle towards the bottom and solution rises to the top. A conventional rake mechanism is provided which is rotated at a speed determined by the solids settling rate to produce a solids-liquid ratio desired in the underflow from which optimum results are obtained in the following solids-liquid separation step.

There are generally four distinct zones of settling slurry within the thickener. At the top there is a zone of clear water. Beneath this is a zone consisting of aggregates or flocs of solid particles of uniform consistency. This zone is commonly referred to as the zone of flocculated slurry. Beneath this zone is a transition zone and at the bottom a zone of pulp which is undergoing compression and in which the flocs have settled to a point where they rest directly one upon another. The specific gravity of the underflow slurry closely approximates the specific gravity of the slurry in the compression zone. The pulp in the transition zone decreases in percentage solids from the bottom where flocs enter the compression zone to the top where the consistency of the flocculated pulp is the same as that of the original slurry.

It is essential, in order to obtain maximum efficiency in the thickening and solids-liquid separation steps, to ensure that underflow is withdrawn from the thickener at a rate which ensures that the ratio of solids and liquid remains within a predetermined range. In order to maintain this predetermined solids to liquid ratio, it is conventional to withdraw a stream of slurry from the lower part of the thickener and measure the specific gravity of the stream. The speed of the discharge is varied according to the measured specific gravity. If the specific gravity is too low, too much liquid is being discharged with the thickener underflow and the speed of the pump is reduced. Conversely, if the density is too high, the speed of the pump is increased to reduce the solids to liquid ratio.

The above described method suffers from a number of disadvantages. If a reduction in the specific gravity of the underflow slurry is noted, the pump must be shut off or its speed decreased for a lengthy period of time before the underflow specific gravity will restored. This is because a decrease in underflow specific gravity usually indicates that the level of the boundary dividing the compression and transition zones in the thickener is at or near the bottom of the thickener. In order to ensure sufficient thickening of the slurry and to ensure that the underflow and overflow fraction may be withdrawn from the thickener at a relatively uniform rate, the thickener must be operated so that the elevation of the boundary between the compression and transition zones is well above the underflow discharge. A considerable period of time is required to restore the boundary to the desired elevation and during this period, the pump must be shut off entirely or its speed considerably reduced. MOreover to prevent overflowing of the thickener, the flow of slurry to the thickener must be stopped. As a result, costly shutdowns occur in operations preceding and following the thickening step.

It is accordingly an object of the present invention to provide a method of maintaining the solids to liquid ratio of the thickener underflow slurry within a predetermined range and an apparatus especially adapted to carry out the method.

It is another object to provide a method and apparatus for detecting changes in the level of the boundary between the compression and transition zones and for restoring the boundary to a desirable level should undesired changes in the boundary level occur.

According to the invention a method is provided for controlling the solids to liquid ratio of underflow slurry from the thickener having a top into which a slurry comprised of a mixture of solid particles and solution is continuously fed and a discharge port at the bottom of the thickener for the continuous withdrawal of the underflow slurry, the slurry after being fed into the thickener settling into a lower compression zone in which flocs of the solid particles rest directly upon one another, the method including the steps of: measuring changes in the average specific gravity of the slurry over a vertical section commencing within the compression zone, extending upwardly and terminating above the zone and regulating the rate of removal of the underflow slurry in response to the measured changes such that the desired solids to liquid ratio is maintained.

The apparatus for controlling the solids to liquid ratio of the underflow slurry is used in conjunction with a thickener having a top into which a slurry comprised of a mixture of solids and solution is continuously fed, a side wall and a discharge port at the bottom of the thickener for continuous withdrawal of the underflow slurry, the slurry after being fed into the thickener settling into a lower compression zone. The apparatus includes means for measuring changes in the average specific gravity of the slurry between two apertures formed in the side wall of the thickener, one aperture opening into the compression zone and the other aperture opening into a zone above the compression zone, and means for regulating the rate of removal of the underflow slurry in response to the measured changes such that the desired solids to liquid ratio is maintained.

An understanding of the method and apparatus of this invention may be obtained from the following description, reference being made to the accompanying drawing showing the apparatus according to the invention partly in section and partly schematically.

Like reference characters refer to like parts throughout the description and drawing.

Referring to the drawing, the numeral 10 indicates a conventional thickener or settling tank. Conventionally, it is a cylindrical vessel of a height and diameter determined by the nature of the slurry and the desired slurry underflow output per unit of time.

The thickener is provided with an inlet conduit 11 which is connected to a source of slurry to be treated. The conduit 11 extends into the top of the thickener. An overflow launder 12 surrounds the top of the thickener in which the overflow is collected and passed to further treatment.

The thickener bottom has a conical central portion 13 which slopes downward from horizontal lower wall 14 towards a discharge outlet 15 at the center thereof. A rake 16 is positioned near the bottom and is rotated at constant speed to move solids radially inward toward outlet 15.

The feed of slurry to the thickener, the overflow of clear liquid from launder 12 and the discharge of thickener underflow from outlet 15 are continuous. The rates of feed and discharge are usually adjusted to achieve a high density underflow slurry while maintaining the density of the overflow below a predetermined limit.

The profiles of the zones of settling slurry within the thickener will depend upon the nature of the slurry and the rates of feed and discharge. The profile in dashed lines in the drawing illustrates the typical boundaries between zones of a slurry comprised of 20 percent of a nickeliferous oxide ore such as garnieritic and serpentinic laterite and 80 percent aqueous ammoniacal solution and undissolved metal values. The rate of feed of the slurry to the thickener and the rate of discharge therefrom are adjusted to maintain the specific gravity of the slurry at the levels indicated in the drawing. The numeral 18 designates the upper zone of clear liquid and the numeral 19 designates the zone of flocculated slurry of uniform consistency. Numerals 20 and 21 identify transition zone and compression zone respectively. Beneath compression zone 21 at the periphery of the thickener is a dead-bed 22.

A conduit 23 is connected to the outlet port 15 which conduit extends to a variable speed pump 24. This pump 24 is of a conventional type, such as a centrifugal pump, for pumping mixtures of solids and liquids. A conduit 25 extends from pump 24 to a solids-liquid separation apparatus, not shown.

Two apertures or tap points 26 and 27 open into the side wall of thickener 10. Aperture 26 is slightly above the upper surface of compression zone 21 and aperture 27 opens into the conical portion 13. One end of a water purged conduit 28 terminates at aperture 26 and is connected at the other end to the low pressure chamber 29 of a conventional differential pressure meter 30. One end of a second water purged conduit 31 is connected to the high pressure chamber 32 of the pressure meter and the other end of the conduit communicates with aperture 27.

Variations in the differential pressure within chambers 29 and 32 are communicated by means of a conventional force balance transmission unit 34 to gauge 35.

The average slurry specific gravity varies linearly with the differential pressure of the slurry between the two apertures. The relationship between average specific gravity and average pressure is expressed by the following formula:

$$\Delta P = \text{av. } SG \times h \times k$$

where: $\Delta P$ is the differential pressure of the slurry between the two apertures.

av. $SG$ is the average specific gravity between the two apertures.

$h$ is the difference in elevation between the two apertures, and $k$ is a constant.

Gauge 35 is calibrated to provide direct readings of average specific gravity of the slurry between the two apertures.

Conventional means, not illustrated, may be provided for sending electrical or pneumatic signals to an apparatus which controls the speed of pump 24 when the average specific gravity exceeds or falls below a predetermined range. Alternatively, the differential pressure meter may be visually monitored by an operator who makes adjustments to the speed of the pump to maintain the average specific gravity of the slurry within the predetermined range.

When the thickener is operating in the desired manner, the boundary between transition zone 20 and compression zone 21 will be between apertures 26 and 27. The pressure of the slurry acting at aperture 27 will be greater than the pressure acting at aperture 26. The average specific gravity of the slurry between the two apertures will be displayed on gauge 35. As the boundary falls, the differential pressure of the slurry between apertures 26 and 27 will decrease. This reduction in pressure will be transmitted to meter 30 and will be immediately apparent from gauge 35. Unless remedial steps are taken the specific gravity of the thickener underflow will decrease to an unacceptably low level and too much of the liquid fraction will be discharged through outlet 15. In order to restore the boundary between zones 20 and 21 to the desired level, the speed of pump 24 must be decreased in order to extend the settling time of the solid particles in the thickener. As the boundary rises to aperture 26, the average specific gravity of the slurry will increase and the speed of pump 24 must be increased in order to accelerate the rate of withdrawal of the underflow slurry. An increase in the rate of withdrawal will result in decreased settling time of the solid particles in the thickener and the average specific gravity of the slurry between the two apertures will diminish.

Thus the speed at which pump 24 is driven and the rate at which underflow slurry is withdrawn from tank 10 is at all times controlled by the corrections required to maintain the average specific gravity of the slurry between apertures 26 and 27 at a predetermined level.

It is important to note first, that pressure of the slurry is measured at two points in order to obtain the average specific gravity over a predetermined vertical section and secondly, that the boundary dividing compression and transition zones 21 and 20 intersects the section.

Because the specific gravity of many slurries does not increase uniformly with depth, the measurement of specific gravity of slurry at one point in most cases provides little or no indication of major changes in the level of boundaries between adjacent settling zones. In order to detect changes in zone levels, the differential pressure or average specific gravity must be obtained over a vertical section and the boundary between adjacent zones must intersect the vertical section. Since the specific gravity of the underflow slurry will closely approximate the specific gravity of the slurry in the lower level of the compression zone, the vertical section should intersect the boundary between the compression and transition zones. Preferably, the upper end of the vertical section is below the boundary dividing the transition zone and the zone of flocculated slurry. If the upper end is above this or higher settling boundaries, it will be difficult to relate changes in differential pressure of the slurry between the ends of the vertical section with changes in specific gravity of the underflow slurry.

The present method and apparatus for controlling the solids to liquid ratio of underflow slurry is distinctly superior to the conventional method of withdrawing a stream of slurry from the lower part of the thickener and measuring the specific gravity of the stream. According to the present method and apparatus, undesirable changes in the level of the boundary between the compression and transition zones are immediately detected. Steps may be taken to correct the changes immediately before the solids to liquid ratio of the underflow strays from the desired range. By contrast, major changes in the boundary between the two zones cannot be detected by the conventional method until the specific gravity of the slurry decreases sharply indicating that the boundary is beneath the thickener. In such event, the discharge pump must be shut off entirely in order to restore the boundary to the required level.

The operation of the method and apparatus of this invention is relatively simple. It is described by way of example as incorporated in an overall process and apparatus for separating undissolved or solids residue from leach solution derived from leaching reduced lateritic ores with an aqueous ammoniacal leach solution. The starting slurry fed into the thickener is made up of about 20 percent by weight solid particles and 80 percent by weight aqueous ammoniacal solution.

The thickener was 14 feet in diameter and 8 feet high. The tank was constructed of reinforced concrete with a corrosion and abrasion resistant lining and was equipped with a revolving rake mechanism. Apertures 26 and 27 were formed in the wall of the thickener, aperture 26 being 30 inches above the lower wall 14 of the thickener and aperture 27 being 3 inches beneath lower wall 14.

The particles making up the solids fraction of the slurry fed into the thickener were about 90 percent minus 200 mesh standard Tyler screen in size and settled at the rate of about 28 feet per hour. The liquid fraction of the slurry fed into the thickener had a specific gravity of about 1.01.

In order to obtain a clear filtrate which contained less than about 1 percent solids in the filtering step at an economically practical rate of filtering, it was necessary that the boundary between the compression and transition zones within the thickener be maintained between 6 inches and 30 inches from the lower wall of the thickener. To maintain the solids level at the desired height, it was necessary to adjust the differential pressure acting on meter 30 to within 14.85 inches and 23.10 inches $H_2O$ which corresponds to an average specific gravity range of 1.45 to 1.70.

The speed of the pump 24 varies according to the correction which must be made in the differential pressure to maintain it at a predetermined level. That is, if the differential pressure is low, the speed of pump 24 is reduced to provide more settling time for the solids fraction of the slurry in the thickener. Alternatively, the speed of the pump is increased as the differential pressure is increased above the desired level to reduce the settling time of the solid particles in the thickener.

It will be understood of course that modifications can be made in the preferred embodiment of the invention described herein without departing from the scope of the invention defined by the appended claims.

What we claim as new and desire to protect by Letters Patent of the United States:

1. The method of controlling the solids to liquid ratio of underflow slurry from a thickener having a top into which a slurry comprised of a mixture of solid particles and solution is continuously fed, and a discharge port at the bottom of the thickener for continuous withdrawal of the underflow slurry, said slurry after being fed into said thickener settling into a lower compression zone in which flocs of said solid particles rest directly upon one another said method including the steps of: measuring changes in the average specific gravity of said slurry over a vertical section by comparing the pressure of said slurry at opposite ends of said section, said section commencing within said compression zone, extending upwardly and terminating above said zone; regulating the rate of removal of said underflow slurry in response to the said measured changes such that the desired solids to liquid ration is maintained.

2. The method of controlling the solids to liquid ratio of underflow slurry from a thickener having a top into which a slurry comprised of a mixture of solid particles and solution is continuously fed, and a discharge port at the bottom of the thickener for continuous withdrawal of the underflow slurry, said slurry after being fed into said thickener settling into a lower compression zone in which flocs of said solid particles rest directly upon one another, a transition zone immediately above said compression zone and a zone of flocculated slurry having the same consistency as that of the slurry fed to the thickener and lying immediately above said transition zone, the content of said solid particles in said transition zone being a maximum at the bottom of said zone and decreasing upwardly, said method including the steps of: measuring changes in the average specific gravity of said slurry over a vertical section by comparing the pressure of said slurry at opposite ends of said section, said section commencing within said compression zone, extending upwardly and terminating within said transition zone, regulating the rate of removal of said underflow slurry in response to the said determined changes such that the desired solids to liquid ratio is maintained.

3. In combination: a thickener having a top into which a slurry comprised of a mixture of solid particles and solution is continuously fed, a side wall and a discharge port at the bottom of said thickener for continuous withdrawal of underflow slurry, said slurry after being fed into the thickener settling into a lower compression zone, two vertically spaced apertures formed in the side wall of said thickener, one said aperture opening into said compression zone and the other said aperture opening into a zone above said compression zone; means for comparing the pressure of said slurry at said two apertures in order to determine changes in the average specific gravity between said apertures and means for regulating the rate of removal of said underflow slurry in response to the determined changes such that a desired solids to liquid ratio is maintained in said underflow slurry.

4. The apparatus as claimed in claim 3 wherein said comparing means comprises a differential pressure meter having a pair of chambers separated by a pressure sensitive diaphragm, a conduit extending from each said chamber to each said aperture and gauge for indicating deflections of said diaphragm.

* * * * *